Patented May 19, 1942

2,283,829

UNITED STATES PATENT OFFICE 2,283,829

DIAZOTIZABLE AZODYESTUFFS

Fritz Suckfüll, Leverkusen-Wiesdorf, and Heinrich Clingestein, Cologne-on-the-Rhine, Germany, assignors to General Aniline & Film Corporation, a corporation of Delaware No Drawing. Original application March 9, 1938, Serial No. 194,833. Divided and this application November 7, 1940, Serial No. 364,670. In Germany March 17, 1937

3 Claims. (Cl. 8—46)

The present invention relates to new diazotizable azodyestuffs, to a method of preparing the same, to a process of dyeing and to dyed fibers; more particularly it relates to diazotizable yellow azodyestuffs which may be represented by the general formula:

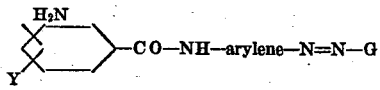

In this formula G stands for the radical of a "yellow component" or several "yellow components" which are connected by azo groups, G being free from diazotizable amino groups, Y stands for a negativating substituent.

Our new dyestuffs are obtainable by causing arylene diamines which may contain solubilizing groups to react on one side with an aroyl halide containing in the aryl nucleus besides a substituent being convertible into the amino group, such as a nitro group or an acylamino group, a negativating substituent, diazotizing the free amino group, coupling with a yellow component and finally converting the convertible substituent of the aroyl radical into the amino group, for instance, by reduction or saponification. In case the yellow component contains a diazotizable amino group, this is, before converting the said convertible group, diazotized and coupled with a further yellow component, and if this again contains a diazotizable amino group, the procedure is repeated. The final component is free from a diazotizable amino group.

Suitable aroyl halides for our process are halides of the following formula:

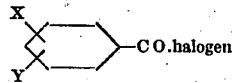

wherein X stands for substituent being convertible into the amino group, such as a nitro group or an acylamino group and Y stands for a negativating substituent, as, for instance, —CN, —SO₂—, —CO—, —NO₂, or halogen; the divalent substituents —SO₂— and —CO— have one bond attached to the aryl nucleus, while the other bond may carry any radical. Such halides are, for instance, cyanonitrobenzoyl chlorides, mono- or dihalogen-nitro-benzoyl chlorides, dinitrobenzoyl chlorides, the acid chlorides of nitrophenylalkylsulfone carboxylic acids and so on.

As suitable yellow components for our new dyestuffs may be mentioned by way of example pyrazolones, acetoacetic arylides, ketoles, phenol-o-carboxylic acids or the derivatives or substitution products thereof.

Our new dyestuffs show in contrast to the known dyestuffs, which do not contain the negativating substituent in the amino aroyl radical the advantage, when diazotized on the fiber and developed with β-naphthol, of yielding yellower shades. The diazotizable dyestuffs used until now for yellow shades had to be developed with pyrazolones in order to obtain the yellow shade, for, when developed with β-naphthol, these dyestuffs yield red to orange shades. The technical advantage of the present dyestuffs becomes chiefly evident in shading, as in the dyeing practice mostly not the pure diazotizable dyestuffs but mixtures of the same are used, in order to obtain different shades in different directions, such as fashion shades and so on. Although most of the diazotizable dyestuffs are developed with β-naphthol a yellow-shading was not possible with dyestuffs of the "β-naphthol-series" up to the present. The known yellow diazotizable dyestuffs had, without exception, to be developed with pyrazolone as already mentioned above, and therefore they were not suitable for shading in the "β-naphthol series". Only such a diazotizable dyestuff can be suitable for this purpose which yields developed with β-naphthol yellow shades, since it is practically not possible to develop either successively or simultaneously with β-naphthol and pyrazolone. In some cases it was possible to shade with orange instead of yellow, however, the reddish tinge shown by the dyeings thus produced, mostly proved very undesirable. Owing to this quite a number of shades wanted could not be obtaiend. In the dyeing practice therefore the ardent want existed for diazotizable dyestuffs which can be developed to yellower shades with β-naphthol and with which yellow-shading can be carried out without difficulties. For the first time diazotizable dyestuffs of this kind are disclosed by the present invention; they meet a long felt want and therefore represent a remarkable and important advance in the art.

This application is a divisional of our co-pending earlier application Serial No. 194,833, filed March 9, 1938 now Patent No. 2,228,290, issued January 14, 1941.

The following examples illustrate the invention, without however restricting it thereto, the parts being by weight:

*Example 1*

302 parts of 3.5-dinitrobenzoyl-p-phenylene diamine are diazotized with 69 parts of sodium nitrite and 320 parts of hydrochloric acid (19.5° Bé.); the diazo compound thus obtained is run into a solution prepared from 140 parts of salicylic acid and 300 parts of sodium carbonate. When the coupling is complete the dyestuff thus formed is treated at 55° C. with 420 parts of crystallized sodium sulfide until one nitro group is reduced to the amino group; the dyestuff is isolated by adding salt. It corresponds in its free state to the following formula:

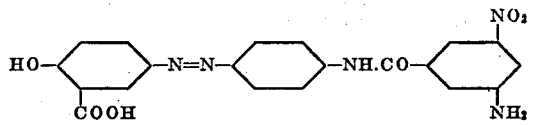

and dyes cotton yellow shades; after diazotization and developing with β-naphthol essentially yellower shades are obtained than with the corresponding reduced dyestuff prepared from m-nitro-benzoyl-p-phenylenediamine, which only differs from the first dyestuff by the absence of the nitro group.

Example 2

188 parts of the 1,3-phenylenediamine-4-sulfonic acid are dissolved in water to a neutral solution and treated—in the presence of an acid binding agent—at 90° C. with 300 parts of the chloride of 4-carboxy-2-nitrophenyl-methyl-sulfone. After cooling, the condensation product of the constitution:

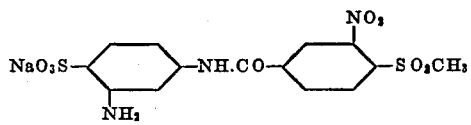

can be isolated in yellowish colored crystals.

437 parts of the condensation product thus obtained are dissolved in water and to the solution at 20° C. 69 parts of sodium nitrite and 300 parts of hydrochloric acid (19.5° Bé.) are added. The diazo compound thus formed is united with 401 parts of the pyrazolone prepared from dehydrothiotoluidine sulfonic acid of the formula:

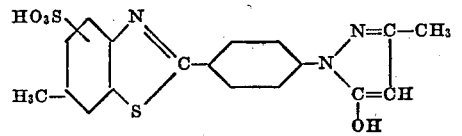

and 280 parts of sodium carbonate, after the coupling is complete the nitro group is reduced with 420 parts of crystallized sodium sulfide to the amino group. The dyestuff obtained corresponds in its free state to the following formula:

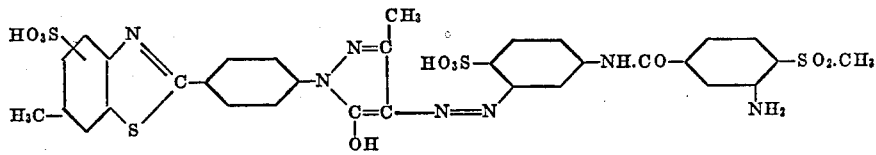

and yields on cotton after diazotization and developing with β-naphthol a distinctly yellower shade than when using the condensation product of the constitution:

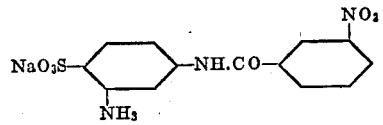

which does not contain the negative substituent.

Example 3

437 parts of the condensation product obtained according to Example 2, paragraph 1, are diazotized and united with 220 parts of m-aminophenylpyrazolone-3-carboxylic acid and 280 parts of sodium carbonate. The isolated monoazodyestuff is further diazotized with 75 parts of sodium nitrite and 500 parts of hydrochloric acid (19.5° Bé.) at 10° C. and the diazo compound is coupled with a further 220 parts of m-aminophenyl-pyrazolone-3-carboxylic acid and 280 parts of sodium carbonate. The separated disazodyestuff is dissolved in water, converted at 10° C. into the diazo compound by adding 75 parts of sodium nitrite and 500 parts of hydrochloric acid (19.5° Bé.) and coupled with 205 parts of 1-phenyl-pyrazolone-3-carboxylic acid and 280 parts of sodium carbonate. The triazodyestuff thus obtained is reduced at 70° C. with 420 parts of crystallized sodium sulfide, separated by adding salt and dried. The dyestuff corresponds in its free state to the following formula:

and yields, when dyed on the fiber, diazotized and developed with β-naphthol, essentially yellower shades than the corresponding trisazodyestuff prepared from the condensation product of the formula:

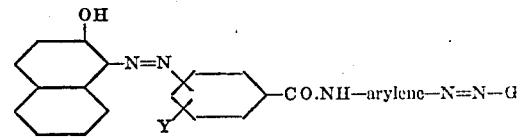

which only differs from the first dyestuff by the absence of the negative radical —SO₂CH₃.

We claim:
1. Cellulosic fibers dyed with a dyestuff of the general formula wherein G stands for the radical of a "yellow component" of the group consisting of pyrazolones, acetoacetic acid arylamides, ketoles, phenol-o-carboxylic acids and combinations of pyrazolones with pyrazolones and of pyrazolones with other yellow components linked by azo groups, G being free from diazotizable amino groups, Y stands for a negativating substituent selected from the group consisting of —CN, —NO₂, halogen, —SO₂— and —CO—, the free valences of the SO₂ and CO groups being connected to an organic radical, and the arylene radical belongs to the benzene series.

2. Cellulosic fibers dyed with a dyestuff corresponding in the form of the free acid to the formula

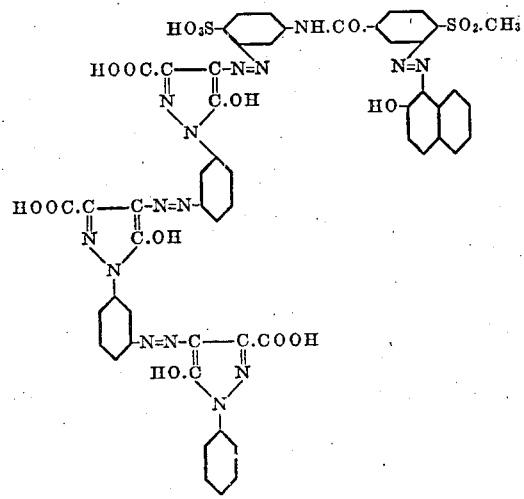

3. Cellulosic fibers dyed with a dyestuff corresponding in the form of the free acid to the formula:

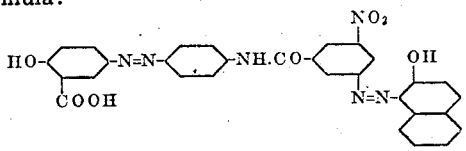

FRITZ SUCKFÜLL.
HEINRICH CLINGESTEIN.